(12) United States Patent
Kitamura

(10) Patent No.: US 11,599,115 B2
(45) Date of Patent: Mar. 7, 2023

(54) TRANSPORT CONTROL DEVICE

(71) Applicant: MURATA MACHINERY, LTD., Kyoto (JP)

(72) Inventor: Wataru Kitamura, Inuyama (JP)

(73) Assignee: MURATA MACHINERY, LTD., Kyoto (JP)

(*) Notice: Subject to any disclaimer, the term of this patent is extended or adjusted under 35 U.S.C. 154(b) by 398 days.

(21) Appl. No.: 16/839,149

(22) Filed: Apr. 3, 2020

(65) Prior Publication Data

US 2020/0379466 A1 Dec. 3, 2020

(30) Foreign Application Priority Data

May 28, 2019 (JP) ............................. JP2019-099522

(51) Int. Cl.
| | |
|---|---|
| *G05D 1/02* | (2020.01) |
| *G05D 1/00* | (2006.01) |
| *G06N 20/00* | (2019.01) |
| *G01C 21/36* | (2006.01) |

(52) U.S. Cl.
CPC ....... *G05D 1/0212* (2013.01); *G01C 21/3605* (2013.01); *G05D 1/0027* (2013.01); *G06N 20/00* (2019.01); *G05D 2201/0213* (2013.01)

(58) Field of Classification Search
None
See application file for complete search history.

(56) References Cited

U.S. PATENT DOCUMENTS

| | | | |
|---|---|---|---|
| 2006/0253244 A1 | 11/2006 | Matsuda | |
| 2010/0138082 A1* | 6/2010 | Ohta | B62D 1/02 701/2 |
| 2019/0101924 A1* | 4/2019 | Styler | G05D 1/0088 |

FOREIGN PATENT DOCUMENTS

| | | | |
|---|---|---|---|
| JP | 2010-282567 A | | 12/2010 |
| JP | 2010282567 A | * | 12/2010 |

OTHER PUBLICATIONS

"Kazunori Shimamura, Conveyance vehicle system, 2010" (Year: 2010).*

* cited by examiner

*Primary Examiner* — James M McPherson
*Assistant Examiner* — Bakari Underwood
(74) *Attorney, Agent, or Firm* — Keating & Bennett, LLP

(57) ABSTRACT

A transport control device includes a state predictor that is machine-learned to output, for each candidate of a setting value of a parameter to control the operation of a transport system, state prediction information indicating a predicted state of the transport system associated with a second period after a first period, and a determinator that determines state prediction information associated with a prediction target period for each candidate of the setting value of the parameter, and determines the setting value of the parameter to be applied to the transport system in the prediction target period based on an evaluation result of the state prediction information for each candidate of the setting value of the parameter.

6 Claims, 9 Drawing Sheets

FIG. 3

| TYPE | CONTENT | DESCRIPTION |
|---|---|---|
| COMMAND ID | UNIQUE SERIAL NUMBER | INFORMATION FOR SPECIFYING TRANSPORT COMMAND |
| Fr | TRANSPORT PORT NUMBER | INFORMATION FOR SPECIFYING PICKUP TRANSPORT PORT |
| To | TRANSPORT PORT NUMBER | INFORMATION FOR SPECIFYING UNLOADING TRANSPORT PORT |
| TRANSPORT PRIORITY | 1-99 | PRIORITY RELATED TO TRANSPORT |
| CARRIER ID | 64 BYTES | INFORMATION FOR SPECIFYING ARTICLE TO BE TRANSPORTED |

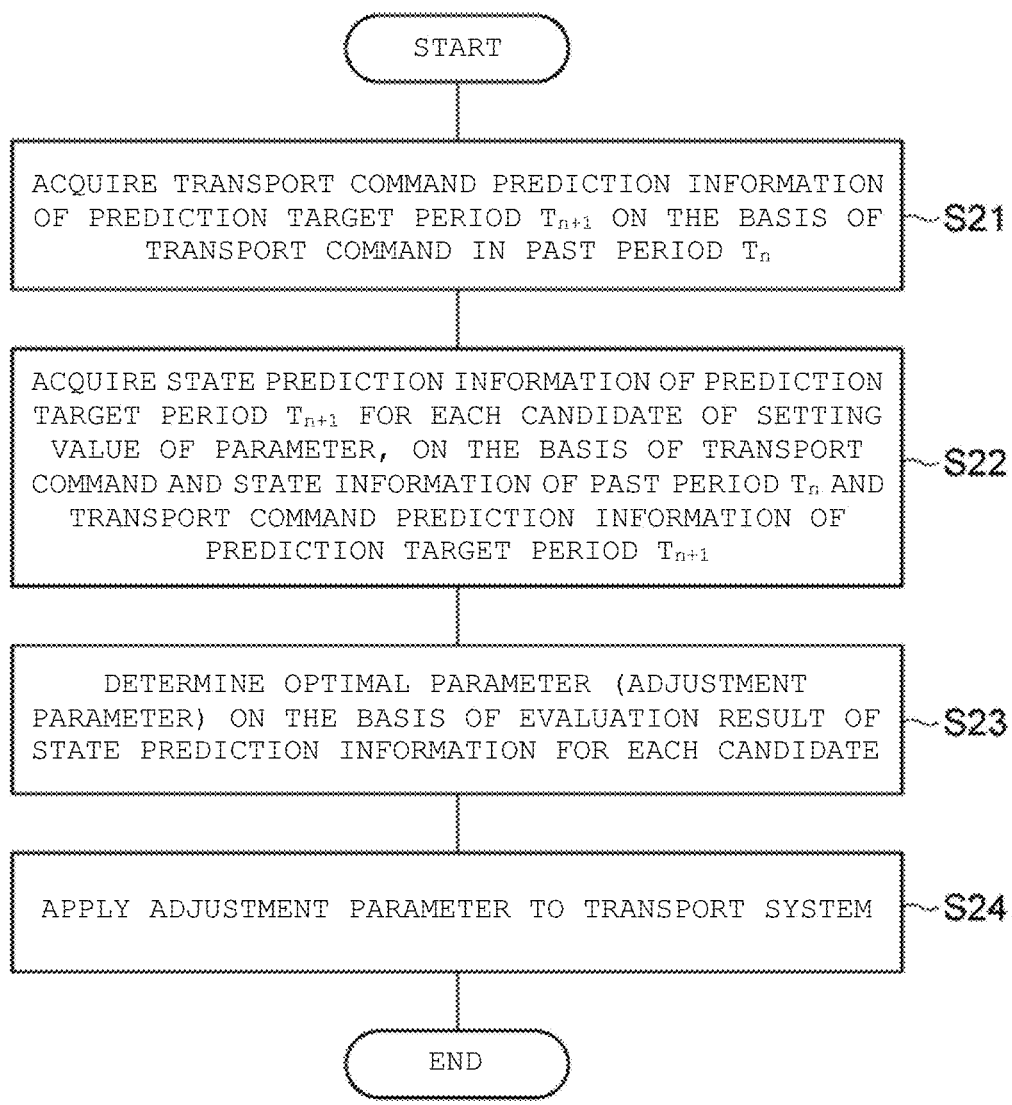

TRANSPORT CONTROL DEVICE

CROSS REFERENCE TO RELATED APPLICATIONS

This application claims the benefit of priority to Japanese Patent Application No. 2019-099522 filed on May 28, 2019. The entire contents of this application are hereby incorporated herein by reference.

BACKGROUND OF THE INVENTION

1. Field of the Invention

The present invention relates to a transport control device.

2. Description of the Related Art

Conventionally, in a semiconductor manufacturing plant or the like, for example, a transport system that controls the traveling of a transport vehicle that transports an article such as a cassette for storing semiconductor wafers has been known (see Japanese Patent No. 4441931 and Japanese Patent Laid-Open No. 2010-282567). In such a transport system, a transport command including information indicating an article to be transported, a pickup position (From point), and an unloading position (To point) is assigned to the transport vehicle by a transport vehicle controller. This enables transport of the article by the transport vehicle. For example, Japanese Patent No. 4441931 describes a method of retrieving a traveling route of a transport vehicle after grasping a traffic congestion state. Japanese Patent Laid-Open No. 2010-282567 discloses a method of predicting the occurrence of traffic congestion based on the occurrence of an event related to a transport vehicle delay.

In the above transport system, it is required to optimize the transport (e.g., to maximize the transport amount per unit time). For this reason, it is required to reduce the occurrence of traffic congestion as much as possible, for example. According to the methods described in Japanese Patent No. 4441931 and Japanese Patent Laid-Open No. 2010-282567, it is possible to reduce the occurrence of traffic congestion. However, the method described in Japanese Patent No. 4441931 inevitably becomes a reactive measure taken after the occurrence of traffic congestion. Additionally, in order to appropriately execute the method described in Japanese Patent Laid-Open No. 2010-282567, it is necessary to appropriately define in advance the contents of the event related to the transport vehicle delay.

SUMMARY OF THE INVENTION

Preferred embodiments of the present invention provide transport control devices that each improve or optimize transport.

A transport control device according to a preferred embodiment of the present invention is a transport control device that controls an operation of a transport system including a transport path, multiple transport vehicles that travel along the transport path and transport an article, and a transport vehicle controller that assigns a transport command to the transport vehicle, the transport control device including a state predictor that is machine-learned to receive input of the transport command and state information indicating a state of the transport system associated with a first period, and output, for each candidate of a setting value of a parameter that controls the operation of the transport system, state prediction information indicating a predicted state of the transport system associated with a second period after the first period, and a determinator that inputs the transport command and the state information associated with a past period before a prediction target period to the state predictor to determine the state prediction information associated with the prediction target period for each candidate of the setting value of the parameter, and determines the setting value of the parameter to be applied to the transport system in the prediction target period based on an evaluation result of the state prediction information for each candidate of the setting value of the parameter.

In the transport control device, the state predictor machine-learned as described above determines, for each candidate of the setting value of the parameter, a predicted state of the transport system in the prediction target period from a transport command and state information of the past period. That is, for each candidate of the setting value of a parameter, a state of the transport system that is predicted to occur in the prediction target period when the setting value of the parameter is applied to the transport system is determined as state prediction information. Then, based on the evaluation result of the state prediction information for each candidate of the setting value of the parameter that has been determined, a setting value of the parameter to be applied to the transport system in the prediction target period is determined. Hence, according to the above transport control device, it is possible to use a prediction result (state prediction information) of a future state of the transport system to determine an optimal setting value of a parameter, so that the future state (i.e., the state in the prediction target period) of the transport system is able to be the best possible state (e.g., a state in which traffic congestion is reduced or prevented and a transport time in the entire transport system is shortened). As described above, the above transport control device is able to improve or optimize transport.

The state of the transport system may include at least one of a transport time for each transport command, a transport amount of an article, an operation rate of the transport vehicle, status information and position information of the transport vehicle, and speed information of the transport vehicle. By using the above information as the state of the transport system, the prediction by the state predictor is able to be appropriately performed. Additionally, when determining a setting value of a parameter to be applied to the transport system in the prediction target period, the determinator is able to appropriately compare or evaluate the state prediction information on the candidates of the setting value of the parameter.

The transport control device may further include a transport command predictor that is machine-learned to receive input of information on the transport command associated with the first period, and output transport command prediction information on the transport command predicted to occur in the second period. The state predictor may be machine-learned to further receive input of the transport command prediction information, and output the state prediction information for each candidate of the setting value of the parameter associated with the second period, and the determinator may input information on the transport command associated with the past period to the transport command predictor to determine the transport command prediction information associated with the prediction target period, and input the transport command and the state information associated with the past period and the transport command prediction information associated with the prediction target period to the state predictor to determine the state prediction information associated with the prediction target period for each candidate of the setting value of the parameter. According to the above features, the state predictor is able to more accurately predict the future state of the transport system in the prediction target period (state prediction information for each candidate of the setting value of the parameter) based on information on a transport command of the prediction target period predicted by the transport command predictor. As a result, the determinator is able to determine a more appropriate parameter to improve or optimize transport.

The parameter may include, for each area defined in the transport path, a target value of the number of empty transport vehicles simultaneously existing in the area. In addition, the parameter may include a ratio at which the transport vehicle uses multiple entrances and multiple exits of an area defined in the transport path. Additionally, the parameter may include a rule to determine which algorithm to use from among multiple route selection algorithms prepared in advance when determining a transport route of the transport vehicle to which the transport command is assigned.

According to the preferred embodiments of the present invention, transport control devices that improve or optimize transport.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 3 is a diagram showing an example of a transport command.

FIG. 9 is a flowchart showing an operation of the transport control device of the second preferred embodiment of the present invention.

DETAILED DESCRIPTION OF THE PREFERRED EMBODIMENTS

Figure 1:
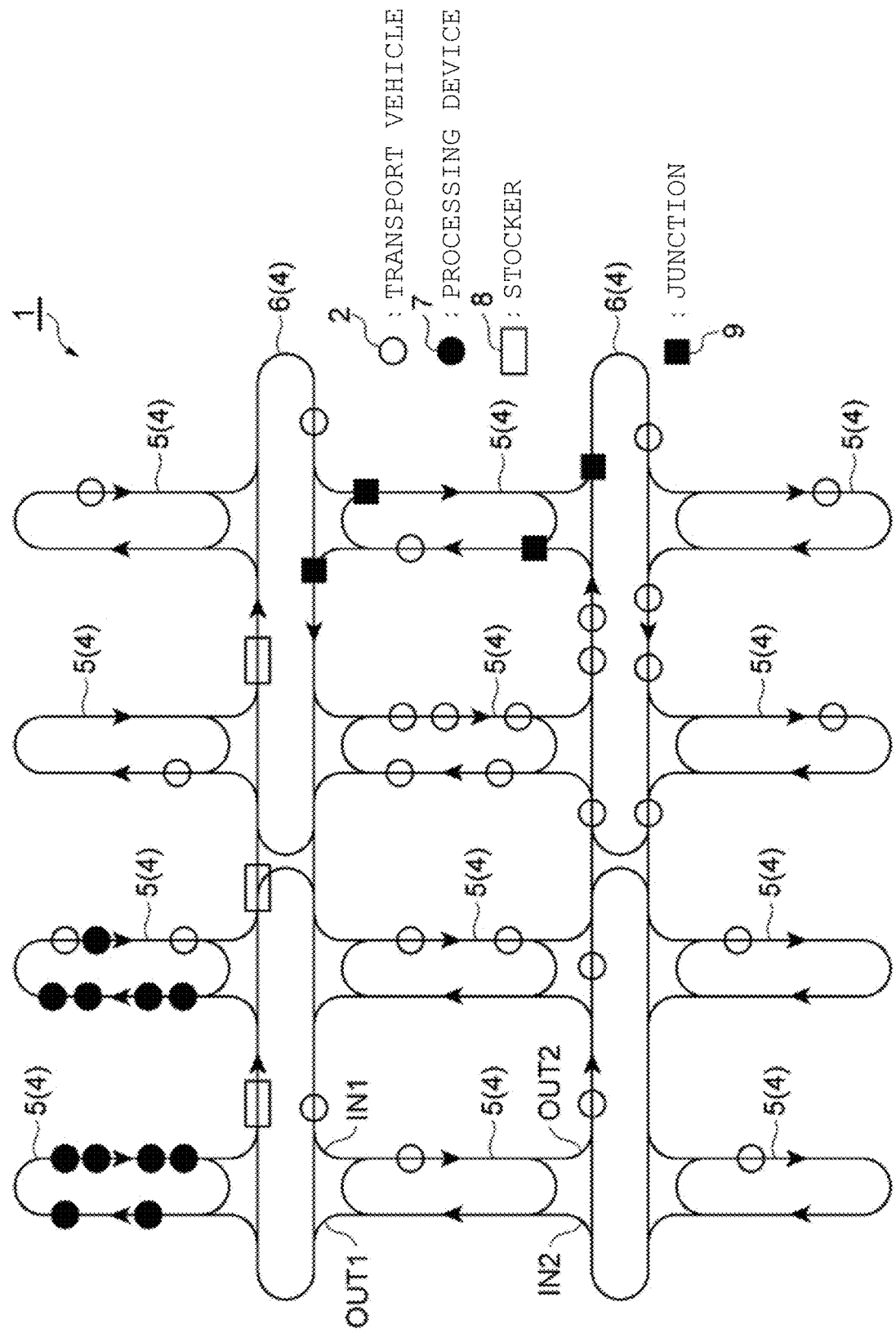
FIG. 1 is a diagram showing a layout example of a transport system.

Hereinafter, preferred embodiments of the present invention will be described with reference to the drawings. Note that in the description of the drawings, the same or equivalent elements will be denoted by the same reference numerals, and redundant description may be omitted.

First Preferred Embodiment

As shown in FIG. 1, a transport system 1 according to the first preferred embodiment of the present invention includes a transport path 4 and multiple transport vehicles 2 that travel along the transport path 4. The transport path 4 is a rail (track) laid in a factory, for example. The transport vehicle 2 is an automated guided vehicle that transports articles. The transport vehicle 2 is an overhead traveling vehicle, a rail guided vehicle, or the like, for example. In the first preferred embodiment, as an example, the transport vehicle 2 is a ceiling transport vehicle that travels along the transport path 4. For example, the transport vehicle 2 is an overhead hoist transfer (OHT). As an example, an article transported by the transport vehicle 2 is a cassette (a front opening unified pod (FOUP)) that stores multiple semiconductor wafers.

The transport path 4 is divided into multiple (twelve in the example of FIG. 1) sections (bays). The transport path 4 includes an intrabay route 5 which is a route in a bay, and an interbay route 6 which is a route connecting different bays. Along the transport path 4, a processing device 7 and a stocker 8 are provided. The processing device 7 is a device that executes processing on a semiconductor wafer. The stocker 8 is a point where the transport vehicle 2 temporarily places articles, and functions as and defines a buffer. A junction 9 is a point on the transport path 4 where exclusive control to eliminate simultaneous entry of multiple transport vehicles 2 is performed.

The processing device 7 and the stocker 8 have an entry port that carries in articles (i.e., a point at which the transport vehicle 2 unloads articles) and an exit port that carries out articles (i.e., a point at which the transport vehicle 2 picks up articles). The entry port and the exit port are located below the transport path 4. The entry port may also be used as the exit port. The stocker 8 has multiple shelves on which articles are placed. Additionally, the stocker 8 has a stacker crane 81 (see FIG. 2) that transports articles among the multiple shelves, the entry port, and the exit port in the stocker 8.

Figure 2:
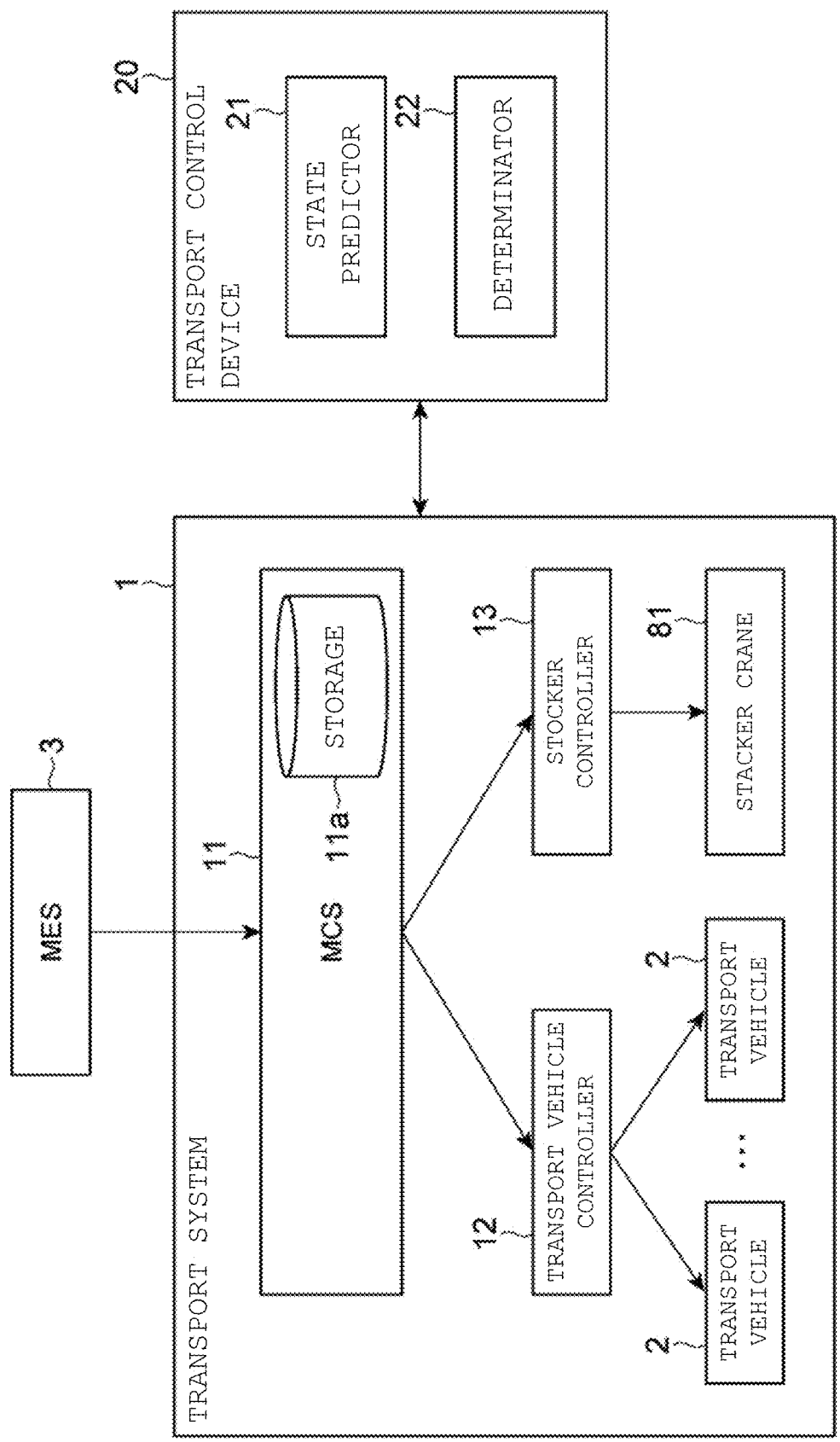
FIG. 2 is a block diagram showing features of a transport control device and the transport system of a first preferred embodiment of the present invention.

As shown in FIG. 2, the transport system 1 has a material control system (MCS) 11, a transport vehicle controller 12, a stocker controller 13, the transport vehicle 2 controlled by the transport vehicle controller 12, and the stacker crane 81 controlled by the stocker controller 13.

The MCS 11 receives a transport request from a host controller (here, a manufacturing execution system (MES) 3 managed by a manufacturer or the like). The MES 3 communicates with the processing device 7. The processing device 7 transmits a transport request (for example, a pickup request or an unload request) for processed articles to the MES 3. The MES 3 transmits the transport request received from the processing device 7 to the MCS 11.

After receiving the transport request from the MES 3, when entry or exit to or from the stocker 8 is to be performed, the MCS 11 transmits a command for entry or exit to the stocker controller 13 at a predetermined timing. In response to the command, the stocker controller 13 transmits an operation command for entry or exit to the stacker crane 81 of the corresponding stocker 8.

Additionally, after receiving the transport request from the MES 3, the MCS 11 converts the transport request into a transport command, and transmits the transport command to the transport vehicle controller 12. Thus, the transport command is assigned to a specific transport vehicle 2 through the transport vehicle controller 12. The transport vehicle controller 12 determines the transport vehicle 2 to which the transport command is assigned based on a predetermined selection criterion. Additionally, the transport vehicle controller 12 executes a predetermined route search algorithm (e.g., a known shortest route search algorithm or the like) to determine a traveling route to execute the transport command, and notifies the transport vehicle 2 of the traveling route. Thus, the transport vehicle 2 travels based on the traveling route.

The transport vehicle controller 12 and the transport vehicle 2 store a route map. The route map is layout information as shown in FIG. 1. Specifically, the route map is information indicating an arrangement of a traveling route (that is, an arrangement of the transport path 4 as shown in FIG. 1), a position set as a home position, a reference position based on the home position, and the coordinates of a transfer position (the entry port, the exit port, and the like described above), and the like. Additionally, the transport vehicle 2 holds position information indicating the coordinates of its own current position, and compares the route map with the position information to perform traveling based on the traveling route determined as described above.

FIG. 3 is a diagram showing an example of information (data items) included in the transport command. In the first preferred embodiment, the transport command includes "command ID", "Fr", "To", "transport priority", and "carrier ID". "Command ID" is ID information that uniquely specifies a transport command. "Fr" is information that identifies a pickup transport port (corresponding to the above-described exit port). "To" is information that identifies an unloading transport port (corresponding to the above-described entry port). "Transport priority" is information indicating a priority related to the transport (here, as an example, a numerical value from 1 to 99). For example, a smaller value is set as the transport priority for a transport command with a higher priority of transport (transport to be completed earlier than a lower priority transport). "Carrier ID" is ID information that identifies an article to be transported. That is, the above-described transport command is information that instructs transport of an article specified by "carrier ID" from a pickup transport port (From point) specified by "Fr" to an unloading transport port (To point) specified by "To".

The transport command is assigned based on a predetermined rule. For example, a transport command to be assigned is preferentially assigned to the transport vehicle 2 existing in a position adjacent to or in a vicinity of a point specified by "Fr" of the transport command to be assigned, among one or more transport vehicles 2 (empty transport vehicles) to which other transport commands are not assigned.

The MCS 11 has a storage 11a that stores a parameter to control the operation of the transport system 1. A parameter is information that defines or restricts at least one operation of the MCS 11, the transport vehicle controller 12, the stocker controller 13, the transport vehicle 2, and the stacker crane 81, for example. A parameter may include information that restricts a route on which the transport vehicle 2 travels among the transport path 4, information that defines a route selection logic of the transport vehicle 2, and the like. For example, a parameter may include an area-vehicle number setting, an area entrance/exit usage ratio, a route selection logic, and the like. Specific examples of a parameter are described herein.

In the first preferred embodiment, as an example, the transport vehicle controller 12, the stocker controller 13, the transport vehicle 2, the stacker crane 81, and the like may be notified of a parameter stored in the storage 11a through the MCS 11. As a result, the parameter is shared in the transport system 1, and the operation of the transport system 1 is controlled based on the parameter. The operation of the transport system 1 is a traveling operation of each transport vehicle 2 determined according to the content of control performed by a controller group (MCS 11, transport vehicle controller 12, stocker controller 13). For example, a setting value of the above parameter determines a timing at which the transport vehicle controller 12 assigns a transport command (e.g., whether to immediately assign a transport command notified from the MCS 11, whether to assign transport commands not to exceed a preset upper limit number of simultaneously executed transport commands, or the like), the type of a route search algorithm executed by the transport vehicle controller 12 to determine the traveling route of the transport vehicle 2, and the like.

Figure 4:
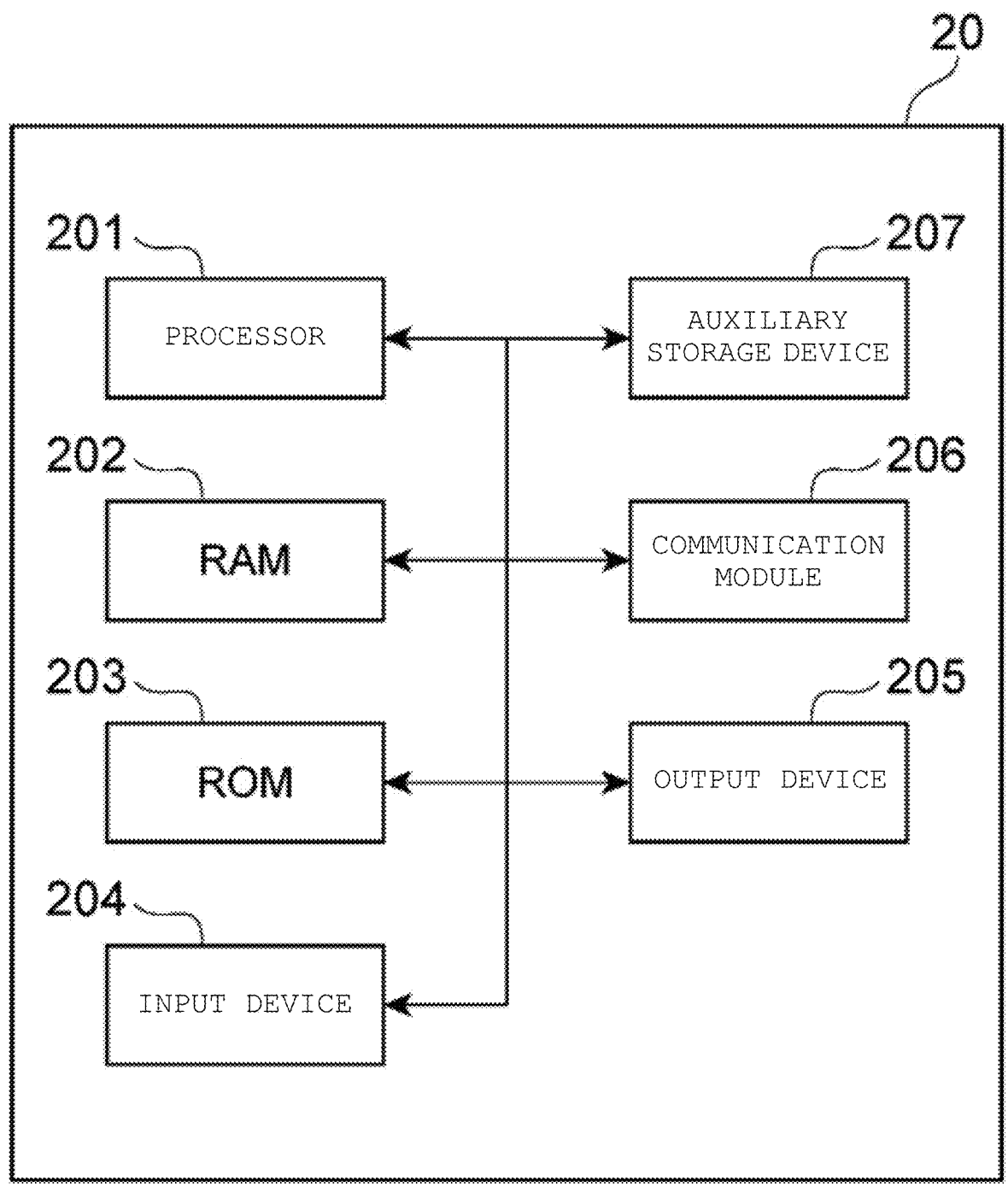
FIG. 4 is a block diagram showing an example of hardware features of the transport control device.

A transport control device 20 controls the operation of the transport system 1 by adjusting the setting value of the above-described parameter. As shown in FIG. 4, the transport control device 20 may be a computer system including a processor 201, for example, one or more central processing units (CPUs), one or more random access memories (RAMs) 202 and one or more read only memories (ROMs) 203 as a main storage device, an input device 204, for example, a keyboard for the operator to input an operation, an output device 205, for example, a display to present information to the operator, a communication module 206 to communicate with the transport system 1 (e.g., MCS 11 or the like), and an auxiliary storage device 207, for example, an HDD and an SSD. The transport control device 20 may include a single server device, or may include multiple server devices that are distributed. Additionally, while the transport control device 20 is a device different from the controller group of the transport system 1 in the first preferred embodiment, the transport control device 20 may be incorporated in a controller (e.g., MCS 11) of the transport system 1.

Each operation of the transport control device 20 described below is implemented by installing a predetermined program in a memory, for example, the RAM 202, operating the input device 204 and the output device 205 as well as the communication module 206 under control of the processor 201, and reading and writing data in the RAM 202 and the auxiliary storage device 207, for example. The transport control device 20 is configured or programmed to include a state predictor 21 and a determinator 22 as components.

The state predictor 21 is a predictive model machine-learned to receive input of a transport command and state information indicating a state of the transport system 1 associated with a first period, and output state prediction information indicating a predicted state of the transport system 1 associated with a second period after the first period. The first period and the second period are a continuous period, for example. The first period and the second period are each a period of a predetermined length. The length of the first period may be the same as the length of the second period, or may be different.

The state predictor 21 outputs state prediction information associated with the second period for each candidate of the setting value of the above-described parameter. For example, the state predictor 21 outputs state prediction information associated with the second period for each of multiple candidates of the setting value of a predetermined parameter. Here, state prediction information associated with the second period corresponding to a setting value a of a certain parameter is a state of the transport system 1 predicted to occur in the second period when the setting value a of the parameter is applied to the transport system 1 in the second period.

Here, a state of the transport system 1 associated with a certain period includes at least one of a transport time for each transport command generated in the period, a transport amount of an article in the period, an operation rate of a transport vehicle in the period, status information (state information, for example, waiting or being transported) and position information of a transport vehicle in the period, and speed information of a transport vehicle in the period.

A transport time of a transport command is a time from when a transport request from the MES 3 is received, to a time when the unloading of an article is completed and a completion notification of the transport command is transmitted to the MES 3. Specifically, a transport time of a transport command is a time (t2-t1) from a time t1 at which the MCS 11 receives a transport request as a basis of the transport command from the MES 3, to a time t2 at which the transport vehicle 2 to which the transport command is assigned completes the unloading of an article specified by a "carrier ID" of the transport command at an unloading transport port specified by "To" of the transport command. Here, regarding a transport command for which the unloading of an article is not completed in the period, a time (t3-t1) from the time t1 at which the MCS 11 receives the transport request as a basis of the transport command to an end time t3 of the period may be used as a provisional transport time, for example. A transport amount of an article in the period is the total number of transports for which the unloading has been completed in the period. An operation rate of the transport vehicle 2 is a ratio "A2/A1" of the number (A2) of the transport vehicles 2 to which the transport command is assigned to the total number (A1) of the available transport vehicles 2. As the operation rate of the transport vehicle 2 in the period, an average, a maximum value, or the like of the operation rates of the transport vehicle 2 in the period may be used, for example. Position information and speed information of a transport vehicle in the period are information on the position of each transport vehicle 2 and information on the speed of each transport vehicle 2. By analyzing status information and position information of each transport vehicle 2 and/or speed information of each transport vehicle 2 during the period, it is possible to determine information in which the degree of traffic congestion for each predetermined area (for example, bay) is quantified, for example.

The state predictor 21 as the predictive model described above is provided by executing machine learning using the following teacher data, for example. That is, in each of the successive past periods T1 and T2, a transport command and state information associated with the period T1 are determined, and a setting value of a parameter actually applied to the transport system 1 in the period T2 and state information associated with the period T2 are determined. Then, teacher data is created by pairing the transport command and the state information associated with the period T1, and the setting value of the parameter actually applied to the transport system 1 in the period T2 and the state information associated with the period T2. Here, the relationship between the period T1 and the period T2 is the same as or similar to the relationship between the first period and the second period described above. By creating the above teacher data for multiple different periods and executing machine learning based on the created multiple pieces of teacher data, the above-described state predictor 21 is able to be provided. The state predictor 21 preferably is a learned model including a neural network, for example. Note that the target of machine learning is not limited to various types of numerical data, and may be image data, for example, a monitor image of the transport system 1.

The determinator 22 inputs a transport command and state information associated with a past period $T_n$ earlier than a prediction target period $T_{n+1}$ to the state predictor 21, to determine state prediction information associated with the prediction target period $T_{n+1}$ for each candidate of the setting value of the parameter. Here, the relationship between the past period In and the prediction target period $T_{n+1}$ is the same as or similar to the relationship between the first period and the second period described above. Additionally, the processing by the determinator 22 is performed at the end of the past period $T_n$. That is, the prediction target period $T_{n+1}$ is a period after the time of processing by the determinator 22. For example, when the setting value α, a setting value β, and a setting value γ are predetermined as candidates of the setting value of a parameter, state prediction information corresponding to the setting value α, state prediction information corresponding to the setting value β, and state prediction information corresponding to the setting value γ are determined.

Then, based on the evaluation result of state prediction information for each candidate determined as described above, the determinator 22 determines a setting value (adjustment parameter) of the parameter to be applied to the transport system 1 in the prediction target period $T_{n+1}$. For example, the determinator 22 selects the most preferable state from the predicted states of the transport system 1 indicated by the state prediction information determined for each of the multiple candidates. For example, the transport time for each transport command is preferably as short as possible, the transport amount of an article is preferably as large as possible, the operation rate of the transport vehicle 2 is preferably in a predetermined appropriate range (e.g., about 70% or less), and there is preferably less traffic congestion. By using at least one of the pieces of information for which the criterion of quality judgment is determined as described above as the predicted state of the transport system 1, it is possible to make an appropriate evaluation among the pieces of state prediction information. Then, the determinator 22 sets a candidate corresponding to the selected state prediction information as an adjustment parameter to be applied to the transport system 1 in the prediction target period $T_{n+1}$. Note that machine learning similar to that of the state predictor 21 may be executed for the determinator 22, too, to determine information on the criterion of quality judgment or the like to select the most preferable state from the predicted states of the transport system 1 indicated by the state prediction information determined for each of the multiple candidates.

Figure 5:
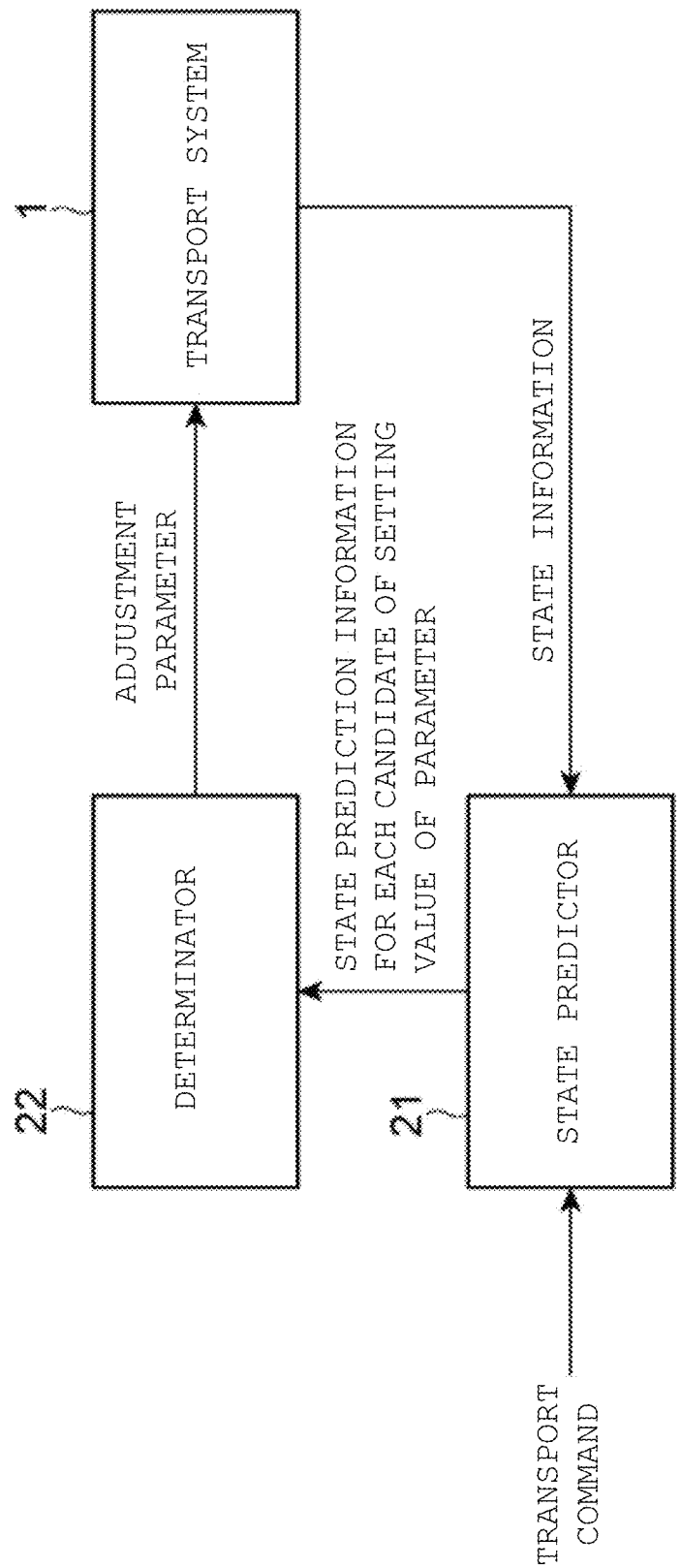
FIG. 5 is a diagram a flow of determining an adjustment parameter by the transport control device of the first preferred embodiment of the present invention.
Figure 6:
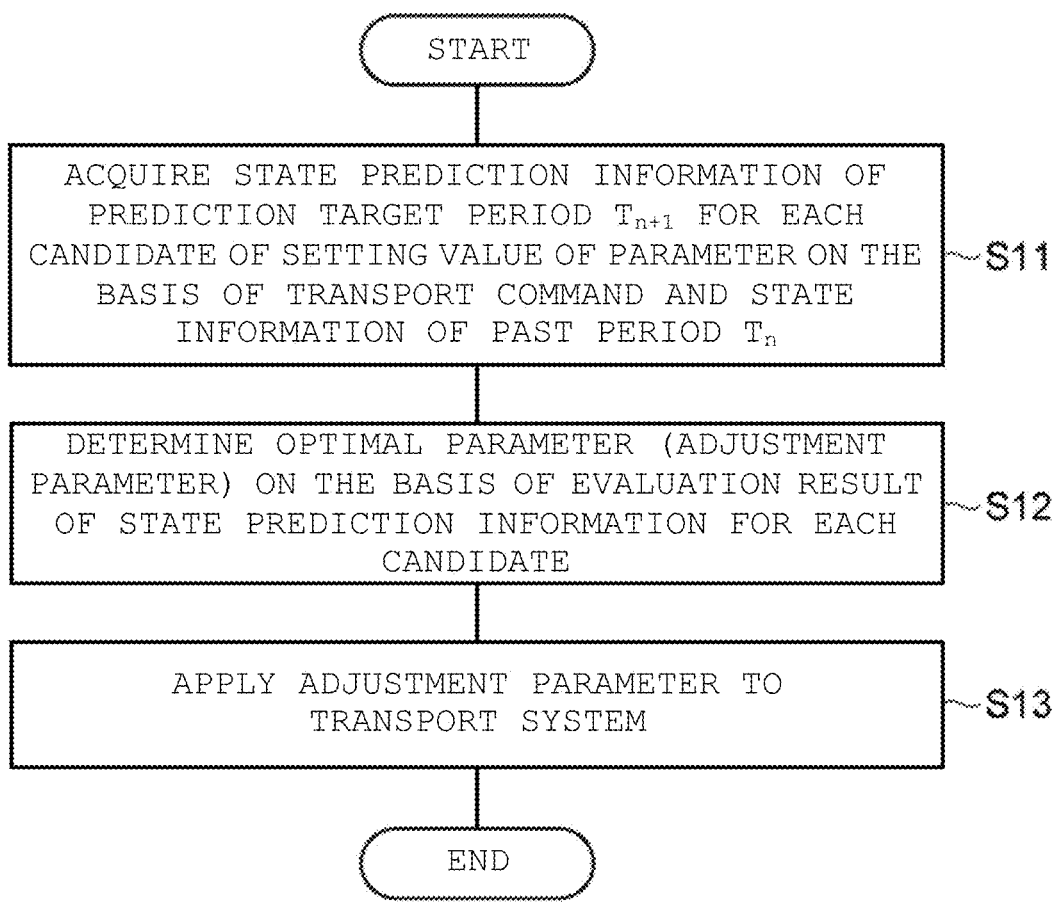
FIG. 6 is a flowchart showing an operation of the transport control device of the first preferred embodiment of the present invention.

FIG. 5 is a diagram showing a flow of determining an adjustment parameter by the transport control device 20. FIG. 6 is a flowchart showing the operation of the transport control device 20. As shown in FIGS. 5 and 6, first, a transport command associated with the past period $T_n$ and state information associated with the past period $T_n$ are input to the state predictor 21, so that state prediction information for each candidate of the setting value of the parameter associated with the prediction target period $T_{n+1}$ is output. As a result, state prediction information of the prediction target period $T_{n+1}$ is determined for each candidate of the setting value of the parameter (step S11). Note that the transport control device 20 is able to provide a transport command associated with the past period $T_n$ from the MCS 11 that generates the transport command, for example. Additionally, the transport control device 20 is able to determine state information associated with the past period $T_n$ from a system (not shown) or the like that monitors the state of the transport system 1.

Subsequently, the determinator 22 determines an adjustment parameter from among the multiple candidates by evaluating the state prediction information for each candidate of the setting value of the parameter (step S12). Then, the determinator 22 applies the adjustment parameter to the transport system 1 (Step S13). In the first preferred embodiment, the determinator 22 transmits the adjustment parameter to the MCS 11. As a result, the adjustment parameter is stored in the storage 11a of the MCS 11, and the operation of the transport system 1 is controlled based on the adjustment parameter in the prediction target period $T_{n+1}$.

Next, examples of parameters used in the state predictor 21 and effects provided when the parameters are used will be described.

FIRST EXAMPLE

In a first example, the state predictor 21 uses "area-vehicle number setting" as the parameter. That is, the state predictor 21 outputs state prediction information for each candidate of the setting value of area-vehicle number setting. An area is a section defined in the transport path 4 (see FIG. 1). In the first preferred embodiment, an area is a bay section. An area controller (e.g., a controller under the control of the transport vehicle controller 12) that controls the transport vehicle 2 in an area may be provided for each area as described above. An area-vehicle number setting is a target value (prescribed number of vehicles) of the number of empty transport vehicles simultaneously existing in an area, provided for each area. For example, when three areas A, B, and C exist, the setting value of the area-vehicle number setting can be expressed as $\{N_A, N_B, N_C\}$. Here, "$N_K$" (K=A, B, C) is the prescribed number of vehicles in an area K.

For example, the transport vehicle controller 12 may perform the following dispatch control of the transport vehicle 2 for each area based on the area-vehicle number setting. Note that the dispatch control may be performed through the area controller described above. When the number of empty transport vehicles in a certain area is larger than the prescribed number of vehicles, the transport vehicle controller 12 moves the empty transport vehicles in the area out of the area, so that the number of empty transport vehicles in the area is equal or substantially equal to the prescribed number of vehicles. On the other hand, when the number of empty transport vehicles in a certain area is smaller than the prescribed number of vehicles, the transport vehicle controller 12 moves empty transport vehicles existing outside the area (in another area) into the area, so that the number of empty transport vehicles in the area is equal or substantially equal to the prescribed number of vehicles. As described above, the transport vehicle controller 12 compares the area-vehicle number setting with the distribution of empty transport vehicles at a predetermined timing (or periodically), and adjusts the distribution of empty transport vehicles in the entire transport system 1. That is, the area-vehicle number setting is a parameter that affects the adjustment of the distribution of empty transport vehicles by the transport vehicle controller 12.

Here, if there are three areas A, B, and C as described above, the setting values of the area-vehicle number setting at the current time (a boundary time between the past period $T_n$ and the prediction target period $T_{n+1}$) are {2,2,5}, and the number of empty transport vehicles actually existing in each area at the present time are the same or substantially the same as the above setting values (i.e., two vehicles in the area A, two vehicles in the area B, and five vehicles in the area C). Also, if the number of transport commands (predicted transport commands) predicted to occur in the prediction target period $T_{n+1}$ is nine, the distribution of pickup points (Fr) of the transport commands are {4,4,1} (i.e., four transport commands for pickup in the area A, four transport commands for pickup in the area B, and one transport command for pickup in the area C). Here, information on the predicted transport command may be determined in advance by an operator or the like, or may be predicted based on a transport command associated with the past period $T_n$ and a predetermined prediction rule. Additionally, in a second preferred embodiment of the present invention described herein, information on the above-described predicted transport command is able to be determined from transport command prediction information output by a transport command predictor 23.

For example, the state predictor 21 outputs state prediction information for each of multiple candidates (here, a setting value {4,4,1}, a setting value {3,3,3}, and a setting value {2,2,5}, for example) of the setting value of area-vehicle number setting. As an example, the state predictor 21 outputs, for each candidate of the setting value, a transport time for each predicted transport command and the degree of traffic congestion for each area, as the state prediction information.

As an example, the determinator 22 evaluates each candidate of the setting value with respect to shortening the transport time of a predicted transport command whose transport priority is equal or substantially equal to or higher than the reference ("transport priority" of the transport command is equal or substantially equal to or lower than a predetermined reference value), and lessening traffic congestion in one or more specific areas (specific bays) selected in advance by the operator. Here, a specific area is an area among the multiple areas (bays) that is selected in advance by an operator as an area whose traffic congestion is likely to cause a decrease in the transport efficiency of the entire transport system 1, for example. For example, the determinator 22 calculates a score $S_i$ determined by the following equation (1) for each candidate i (here, i=1, 2, 3) of the setting value. In the following equation (1), $t_j$ is a transport time of a predicted transport command j whose transport priority (predicted value) is equal or substantially equal to or less than a threshold y determined in advance by the operator or the like, and $c_k$ is a predicted degree of traffic congestion for a specific area k. $\alpha_j$ and $\beta_k$ are weight parameters determined in advance by the operator.

$$S_i = \Sigma_j(\alpha_j \times t_j) + \Sigma_k(\beta_k \times c_k) \qquad (1)$$

Here, the smaller the score $S_i$ is, the more desirable the candidate is, as described above. Accordingly, the determinator 22 sets the candidate i of the setting value having the smallest score among the scores $S_i$ of the multiple candidates of the setting value (here, $S_1$, $S_2$, $S_3$) as an adjustment parameter to be applied to the transport system 1 in the prediction target period $T_{n+1}$. According to the evaluation example described above, in the transport system 1, the occurrence of traffic congestion that is likely to cause a decrease in the transport efficiency of the transport system 1 is able to be reduced or prevented, and the transport time of a transport command with a high transport priority is able to be shortened.

Note that the state prediction information for each candidate of the setting value output by the state predictor 21 is not necessarily limited to the first example (the transport time for each predicted transport command and the degree of traffic congestion for each area). For example, as described herein, the state prediction information for each candidate of the setting value may be a predicted transport time of all the predicted transport commands (statistics, for example, average) and the predicted degree of traffic congestion of the entire transport system (statistics, for example, area average).

Other examples of output result for each candidate of setting value of area-vehicle number setting include:

setting value {4,4,1}->predicted transport time of all predicted transport commands (average 30 seconds, dispersion 10 seconds)+predicted degree of traffic congestion of entire transport system (area average: high)

setting value {3,3,3}->predicted transport time of all predicted transport commands (average 40 seconds, dispersion 20 seconds)+predicted degree of traffic congestion of entire transport system (area average: medium)

setting value {2,2,5}->predicted transport time of all predicted transport commands (average 60 seconds, dispersion 60 seconds)+predicted degree of traffic congestion of entire transport system (average area: low)

Additionally, in the first example, "$\alpha_j \times t_j$" is added only for the predicted transport command whose transport priority is equal or substantially equal to or less than the threshold γ. However, when the predicted value of the transport priority for each predicted transport command cannot be determined, "$\alpha_j \times t_j$" may be added for all the predicted transport commands.

According to the first example described above, since the determinator 22 dynamically sets the setting value (adjustment parameter) of the area-vehicle number setting based on the output result of the state predictor 21, it is possible to improve or optimize transport (here, as an example, to reduce or prevent traffic congestion of a specific focused area and to make the transport time of a transport command with a high transport priority as short as possible).

SECOND EXAMPLE

In a second example, the state predictor 21 uses "area entrance/exit usage ratio" as the parameter. That is, the state predictor 21 outputs state prediction information for each candidate of the setting value of a usage ratio of the entrance and the exit of an area (here, intrabay as an example). Here, a use ratio of the entrance (or the exit) is a ratio at which multiple entrances (or exits) are used by the transport vehicle 2 when there are multiple entrances (or exits). Here, the entrance of an area is a route through which the transport vehicle 2 is able to pass from outside the area to enter the area on the transport path 4, and the exit of an area is a route through which the transport vehicle 2 is able to pass from inside the area to exit the area on the transport path 4.

For example, in the example of FIG. 1, two entrances IN1 and IN2 and two exits OUT1 and OUT2 are provided for an intrabay (intrabay route 5) at the center left end. Accordingly, when it is predetermined that the transport vehicle 2 use the entrance IN1 and the entrance IN2 at an equal or substantially equal ratio, the setting value of the use ratio of the entrance of the intra bay may be defined as "Entrance IN1:Entrance IN2=1:1", for example. On the other hand, when it is predetermined that the transport vehicle 2 use only the entrance IN1, the setting value of the usage ratio of the entrance of the intrabay may be defined as "Entrance IN1: Entrance IN2=1:0", for example. The setting value of the parameter is taken into consideration when the transport vehicle controller 12 determines the traveling route of the transport vehicle 2, for example. That is, the transport vehicle controller 12 determines the traveling route of the transport vehicle 2 in consideration of the setting value of the parameter. More specifically, the transport vehicle controller 12 determines the traveling route of each transport vehicle 2, and the actual use ratio of the entrance or the exit of the intrabay becomes the same as or similar to the use ratio of the entrance or the exit defined by the setting value of the parameter.

The state predictor 21 outputs state prediction information for each of multiple candidates of the setting value of the entrance use ratio and the exit use ratio of a specific area (e.g., an area specified in advance by an operator or the like), for example. As an example, the state predictor 21 outputs, for each candidate of the setting value, a transport time for each predicted transport command and the degree of traffic congestion for each area as state prediction information, as similar to the first preferred embodiment. For example, when the specific area is the intrabay at the center left end shown in FIG. 1, the following candidates 1 to 3 may be used as multiple candidates of the setting value, for example.

Candidate 1: Entrance IN1:Entrance IN2=0:1 and Exit OUT1:Exit OUT2=0:1

Candidate 2: Entrance IN1:Entrance IN2=1:1 and Exit OUT1:Exit OUT2=1:1

Candidate 3: Entrance IN1:Entrance IN2=1:0 and Exit OUT1:Exit OUT2=1:0

As an example, as similar to the first example, the determinator 22 sets the candidate i of the setting value having the smallest score among the scores $S_i$ of the multiple candidates of the setting value calculated by the above equation (1) (here, a score $S_1$ of the candidate 1, a score $S_2$ of the candidate 2, a score $S_3$ of the candidate 3) as an adjustment parameter to be applied to the transport system 1 in the prediction target period $T_{n+1}$.

According to the second example described above, since the determinator 22 dynamically sets the setting value (adjustment parameter) of a specific area entrance/exit usage ratio based on the output result of the state predictor 21, it is possible to improve or optimize transport (here, as an example, to reduce or prevent traffic congestion of a specific focused area and to make the transport time of a transport command with a high transport priority as short as possible). Note that in the second example, there may be three or more entrances or exits of a specific area. Additionally, multiple areas may be used as specific areas.

THIRD EXAMPLE

In the third example, the state predictor 21 uses "route selection logic" as the parameter. That is, the state predictor 21 outputs state prediction information for each candidate of the setting value of a route selection logic. Here, a route selection logic is a rule to determine which algorithm to use from among multiple route selection algorithms prepared in advance when determining a transport route of the transport vehicle 2 to which a transport command is assigned.

For example, a case is described below where two different algorithms are prepared as route search algorithms. Specifically, as an example, it is considered a case where shortest route search (e.g., the Dijkstra method or the like, hereinafter referred to as "scheme A"), and statistical cost route search (e.g., a method of finding the shortest route using the statistical cost. hereinafter referred to as "scheme B") are prepared as route search algorithms. In this case, as the multiple candidates of the setting value of the route selection logic, the following candidates 1 to 3 may be used, for example.

Candidate 1: Always use scheme A.

Candidate 2: Use scheme A if the degree of traffic congestion in a predetermined area (e.g., interbay route 6 or the like) is equal or substantially equal to or less than a predetermined threshold, and use scheme B otherwise.

Candidate 3: Use scheme A if the transport priority of the target transport command is equal or substantially equal to or less than a predetermined threshold, and use scheme B if the transport priority is greater than the threshold.

As an example, as similar to the first and second examples, the determinator 22 sets the candidate i of the setting value having the smallest score among the scores $S_i$ of the multiple candidates of the setting value calculated by the above equation (1) (here, a score $S_1$ of the candidate 1, a score $S_2$ of the candidate 2, a score $S_3$ of the candidate 3) as an adjustment parameter to be applied to the transport system 1 in the prediction target period $T_{n+1}$.

According to the third example described above, since the determinator 22 dynamically sets the setting value (adjustment parameter) of the route selection logic based on the output result of the state predictor 21, it is possible to improve or optimize transport (here, as an example, to reduce traffic congestion of a specific focused area and to make the transport time of a transport command with a high transport priority as short as possible).

Note that the above-described first to third examples may be implemented alone or may be combined as appropriate. For example, the determinator 22 may determine the adjustment parameter related to the area-vehicle number setting based on the first example, and also determine the adjustment parameter related to the area entrance/exit usage ratio based on the second example.

In the transport control device 20 described above, the state predictor 21 machine-learned as described above determines, for each candidate of the setting value of a parameter, a predicted state of the transport system 1 in the prediction target period $T_{n+1}$ from a transport command and state information of the past period $T_n$. That is, for each candidate of the setting value of a parameter, a state of the transport system 1 that is predicted to occur in the prediction target period $T_{+1}$ when the setting value of the parameter is applied to the transport system 1 is determined as state prediction information. Then, based on the evaluation result of the state prediction information for each candidate of the setting value of the parameter that has been determined, a setting value (adjustment parameter) of the parameter to be applied to the transport system 1 in the prediction target period $T_{n+1}$ is determined. Hence, the transport control device 20 is able to apply a prediction result (state prediction information) of a future state of the transport system 1 to determine an optimal setting value of a parameter, so that the future state (i.e., the state in the prediction target period $T_{n+1}$) of the transport system 1 is able to be the best possible state (e.g., a state in which traffic congestion is reduced or prevented and a transport time in the entire transport system is shortened). As described above, the transport control device 20 is able to improve or optimize transport.

Additionally, the state of the transport system 1 includes at least one of a transport time for each transport command, a transport amount of an article, an operation rate of the transport vehicle 2, status information and position information of the transport vehicle 2, and speed information of the transport vehicle 2. By using the above information as the state of the transport system 1, the prediction by the state predictor 21 is able to be appropriately performed. Additionally, when determining the adjustment parameter, the determinator 22 is able to appropriately compare or evaluate the state prediction information for each candidate of the setting value of the parameter.

Second Preferred Embodiment

Figure 7:
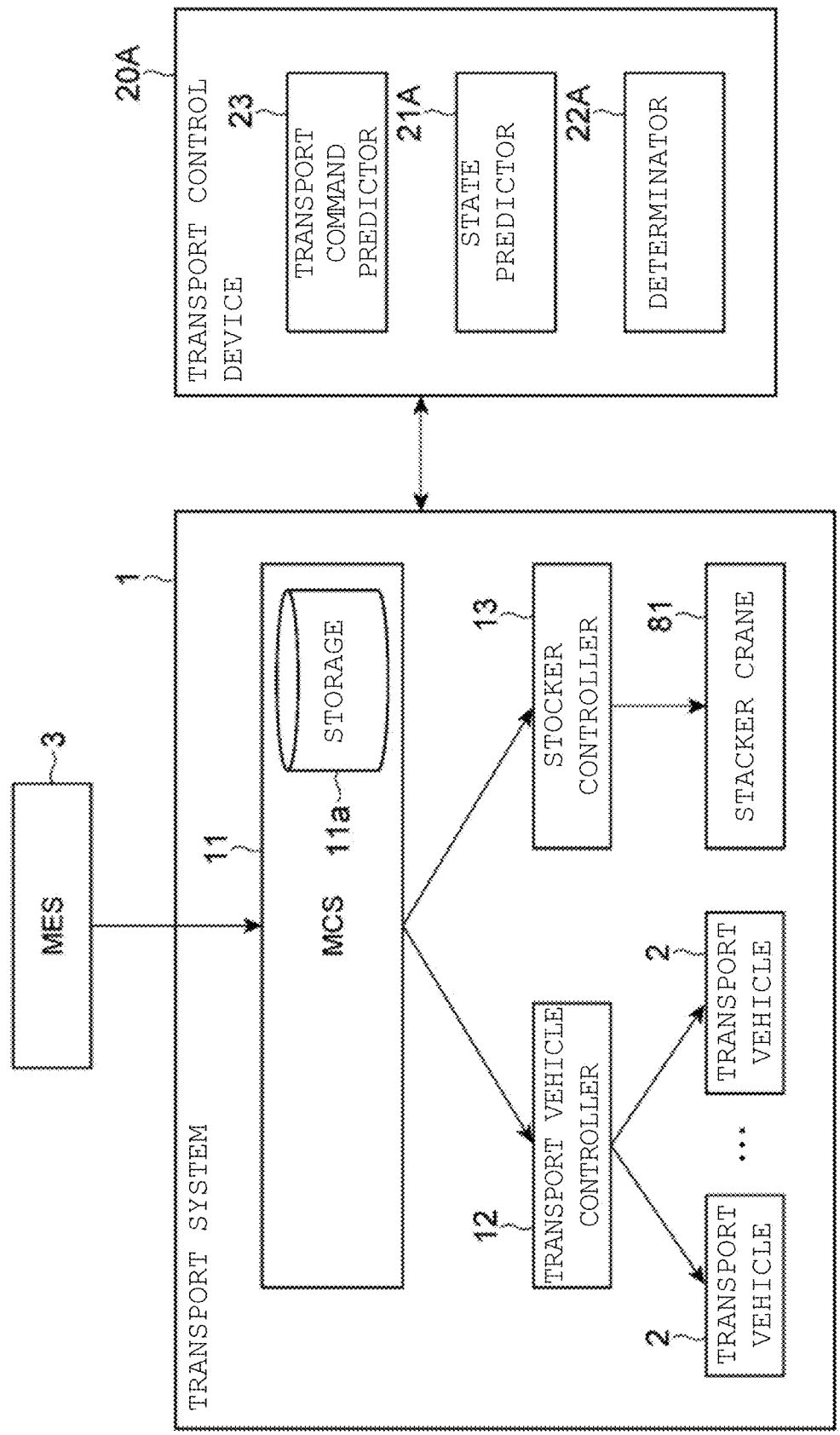
FIG. 7 is a block diagram showing a features of a transport control device and a transport system according to a second preferred embodiment of the present invention.

Next, a transport control device 20A of a second preferred embodiment of the present invention will be described with reference to FIGS. 7 to 9. As shown in FIG. 7, the transport control device 20A differs from the transport control device 20 in that it further includes the transport command predictor 23, that it includes a state predictor 21A instead of the state predictor 21, and that it includes a determinator 22A instead of the determinator 22. Other features are similar to the transport control device 20.

The transport command predictor 23 is a predictive model machine-learned to receive input of information on a transport command associated with a first period, and outputs transport command prediction information on a transport command predicted to occur in a second period after the first period. A transport command associated with the first period is a transport command generated in the first period (e.g., a transport command generated in an MCS 11 based on a transport request that the MCS 11 is notified of by an MES 3 in the first period). There may be multiple transport commands associated with the first period.

Here, a transport request output from the MES 3 that is the basis of a transport command is generated according to a predetermined manufacturing process flow executed over a certain period. Therefore, there is a correlation between a transport command generated in a certain period and a transport command generated in a period subsequent to the period. Hence, by executing machine learning using the following teacher data, for example, the transport command predictor 23 is able to be provided. That is, by aggregating the transport commands in each of consecutive past periods T1 and T2, the number of Fr and the number of To for each bay generated in the period T1 are determined, and the number of Fr and the number of To for each bay generated in the period T2 are determined. Then, teacher data is created in which the number of Fr and the number of To for each bay generated in the period T1 and the number of Fr and the number of To for each bay generated in the period T2 are paired. By aggregating the transport commands for multiple different periods, multiple teacher data as described above is able to be created. Then, by executing machine learning based on the multiple teacher data that has been created, the transport command predictor 23 is able to receive input of information on a transport command associated with the first period (in the second preferred embodiment, the number of To and the number of Fr for each bay in the first period), and output transport command prediction information on a transport command predicted to occur in the second period (the number of To and the number of Fr for each bay in the second period). The transport command predictor 23 preferably is a learned model including a neural network, for example.

The state predictor 21A differs from the state predictor 21 in that it is machine-learned to further receive input of the transport command prediction information output by the transport command predictor 23, and to output state prediction information for each candidate associated with the second period. The state predictor 21A is provided by executing machine learning using teacher data determined by adding a transport command associated with the period T2 to teacher data used for machine learning of the state predictor 21 (a transport command and state information associated with the period T1, and a setting value of a parameter actually applied to the transport system 1 in the period T2 and state information associated with the period T2), for example.

The state predictor 21A is a predictive model machine-learned to receive input of a transport command and state information indicating a state of the transport system 1 associated with the first period and information on a transport command associated with the first period (i.e., information output by the transport command predictor 23 described above), and output state prediction information indicating a predicted state of the transport system 1 associated with the second period. The state predictor 21A outputs state prediction information associated with the second period for each candidate of the setting value of the above-described parameter as similar to the state predictor 21.

The determinator 22A inputs information on a transport command associated with a past period $T_n$ to the transport command predictor 23 to determine transport command prediction information associated with a prediction target period $T_{n+1}$. Then, the determinator 22A inputs the transport command and the state information associated with the past period $T_n$ and the transport command prediction information associated with the prediction target period $T_{n+1}$ to the state predictor 21A to determine state prediction information associated with the prediction target period $T_{n+1}$ for each candidate of the setting value of the parameter. Subsequent processing of the determinator 22A is similar to that of the determinator 22.

Figure 8:
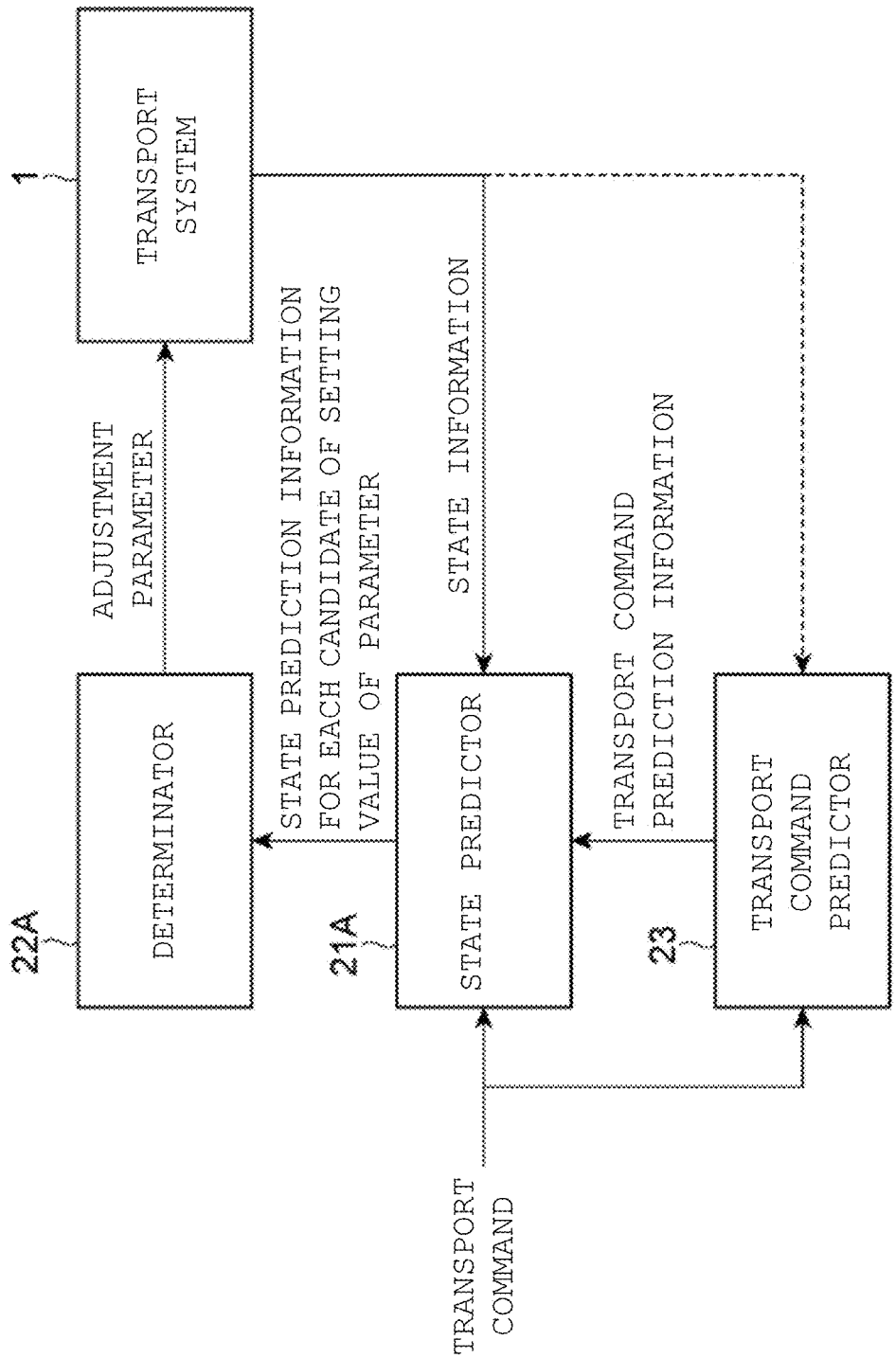
FIG. 8 is a diagram showing a flow of determining an adjustment parameter by the transport control device of the second preferred embodiment of the present invention.

FIG. 8 is a diagram showing a flow of determining an adjustment parameter by the transport control device 20A. FIG. 9 is a flowchart showing the operation of the transport control device 20A. As shown in FIGS. 8 and 9, first, the transport command predictor 23 receives input of information on a transport command associated with the past period $T_n$ (in the second preferred embodiment, the number of To and the number of Fr for each bay in the past period $T_n$), and thereby outputs transport command prediction information (the predicted number of To and number of Fr for each bay in the prediction target period $T_{n+1}$). As a result, transport command prediction information of the prediction target period $T_{n+1}$ is determined (step S21). Note that, as shown by the dotted line in FIG. 8, state information may be input to the transport command predictor 23, and the state information may also be taken into consideration when outputting the transport command prediction information.

Subsequently, the transport command associated with the past period $T_n$, the state information associated with the past period $T_n$, and the transport command prediction information associated with the prediction target period $T_{n+1}$ output by the transport command predictor 23 in step S21 is input to the state predictor 21A. As a result, the state predictor 21A outputs state prediction information for each candidate of the setting value of the parameter associated with the prediction target period $T_{n+1}$. Thus, the state prediction information of the prediction target period $T_{n+1}$ is determined for each candidate of the setting value of the parameter (step S22).

The processing in steps S23 and S24 is the same as or similar to the processing in steps S12 and S13 in the flowchart shown in FIG. 6 described above.

The state of the transport system 1 in the prediction target period $T_{n+1}$ is affected by the transport command generated in the prediction target period $T_{n+1}$. Accordingly, in the transport control device 20A, the state predictor 21A is able to more accurately predict the future state of the transport system 1 in the prediction target period $T_{n+1}$ (state prediction information for each candidate of the setting value of the parameter) based on information on a transport command of the prediction target period $T_{n+1}$ predicted by the transport command predictor 23. As a result, the determinator 22A is able to determine a more appropriate adjustment parameter from the to improve or optimize transport.

While preferred embodiments of the present invention have been described above, the present invention is not limited to the above preferred embodiments, and various changes may be made without departing from the gist of the invention.

For example, the transport control device 20 of the first preferred embodiment does not include the transport command predictor 23, and does not use information on a future transport command (a transport command predicted to occur during the prediction target period) as input information. Note, however, that when the MCS 11 is notified of a transport request scheduled in the future by the MES 3 in advance, and it is possible to know in advance of a transport command predicted to occur in the MCS 11 in the future, for example, the state predictor 21 may use information on the transport command thus predicted as input information.

Additionally, the adjustment parameter determined by the determinators 22 and 22A may be used to control operations of elements other than the elements in the transport system 1, for example, the MCS 11. For example, the MES 3 which is a host controller may be notified of the adjustment parameter, and the operation of the MES 3 (e.g., the timing of notifying the MCS 11 of a transport request) may be controlled by the adjustment parameter.

Additionally, the teacher data used in machine learning of the state predictors 21 and 21A or the transport command predictor 23 described above is newly generated and accumulated in the course of operating the transport control devices 20 and 20A (i.e., in the course of repeatedly executing the operation of the flowchart shown in FIG. 6 or FIG. 9). Hence, the state predictors 21 and 21A or the transport command predictor 23 may be appropriately updated by performing machine learning using the newly generated and accumulated teacher data. As described above, by updating the state predictors 21 and 21A or the transport command predictor 23 as the predictive model while operating the transport control devices 20 and 20A, it is possible to gradually increase the accuracy of the predictive model. That is, it is possible to gradually increase the validity of the adjustment parameter determined by the determinators 22 and 22A.

Additionally, in the above-described preferred embodiments, the FOUP that stores multiple semiconductor wafers is exemplified as the article (object to be transported) transported by the transport vehicle 2. However, the article is not limited to this, and may be another container storing a glass wafer, a reticle, or the like, or may be other articles. Additionally, the place where the transport system 1 is provided is not limited to a semiconductor manufacturing plant, and the transport system 1 may be provided in another facility.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A transport control device that controls an operation of a transport system including a transport path, a plurality of transport vehicles that travel along the transport path, and transport an article, and a transport vehicle controller that assigns a transport command to the transport vehicle, the transport control device comprising:

a state predictor that is machine-learned to receive input of the transport command and state information indicating a state of the transport system associated with a first period, and output, for each candidate of a setting value of a parameter to control the operation of the transport system, state prediction information indicating a predicted state of the transport system associated with a second period after the first period; and a determinator that inputs the transport command and the state information associated with a past period before a prediction target period to the state predictor to determine the state prediction information associated with the prediction target period for each candidate of the setting value of the parameter, and determines the setting value of the parameter to be applied to the transport system in the prediction target period based on an evaluation result of the state prediction information for each candidate of the setting value of the parameter.

2. The transport control device according to claim 1, wherein the state of the transport system includes at least one of a transport time for each transport command, a transport amount of the article, an operation rate of the transport vehicle, status information and position information of the transport vehicle, and speed information of the transport vehicle.

3. The transport control device according to claim 1, further comprising:

a transport command predictor that is machine-learned to receive input of information on the transport command associated with the first period, and output transport command prediction information on the transport command predicted to occur in the second period; wherein the state predictor is machine-learned to further receive input of the transport command prediction information, and output the state prediction information for each candidate of the setting value of the parameter associated with the second period; and the determinator:

inputs information on the transport command associated with the past period to the transport command predictor to determine the transport command prediction information associated with the prediction target period; and inputs the transport command and the state information associated with the past period and the transport command prediction information associated with the prediction target period to the state predictor to determine the state prediction information associated with the prediction target period for each candidate of the setting value of the parameter.

4. The transport control device according to claim 1, wherein the parameter includes, for each area defined in the transport path, a target value of the number of empty transport vehicles simultaneously existing in the area.

5. The transport control device according to claim 1, wherein the parameter includes a ratio at which the transport vehicle uses a plurality of entrances and a plurality of exits of an area defined in the transport path.

6. The transport control device according to claim 1, wherein the parameter includes a rule to determine which algorithm to use from among a plurality of route selection algorithms prepared in advance when determining a transport route of the transport vehicle to which the transport command is assigned.

* * * * *